United States Patent [19]

Babjak et al.

[11] 4,148,631

[45] Apr. 10, 1979

[54] STRIPPING OF COBALT FROM NICKEL-COBALT LOADED ORGANIC

[75] Inventors: Juraj Babjak; Victor A. Ettel, both of Mississauga; Kenneth R. Dymock, Oakville, all of Canada

[73] Assignee: The International Nickel Company, Inc., New York, N.Y.

[21] Appl. No.: 928,401

[22] Filed: Jul. 27, 1978

[30] Foreign Application Priority Data

Dec. 28, 1977 [CA] Canada .................................. 293967

[51] Int. Cl.$^2$ ............................................ C22B 23/04
[52] U.S. Cl. .................................. 75/101 BE; 75/108; 75/119; 204/112; 423/139
[58] Field of Search .................. 75/101 BE, 119, 108; 204/112; 423/139

[56] References Cited

U.S. PATENT DOCUMENTS

| | | | |
|---|---|---|---|
| 3,055,754 | 9/1962 | Fletcher | .................................. 75/97 |
| 3,128,156 | 4/1964 | Long et al. | ...................... 75/101 BE |
| 3,336,133 | 8/1967 | Funatsu | .................................. 75/119 |
| 3,701,650 | 10/1972 | van der Zeeuw | ............... 75/101 BE |
| 3,718,458 | 2/1973 | Ritcey et al. | ........................... 75/119 |
| 3,728,366 | 4/1973 | Michlmayr | ........................ 75/119 X |
| 3,932,581 | 1/1976 | Leimala | .................................. 423/139 |
| 4,004,990 | 1/1977 | Suetsuna et al. | ................ 75/101 BE |
| 4,012,483 | 3/1977 | Kane et al. | .............................. 423/24 |
| 4,042,665 | 8/1977 | Hatch | .................................. 423/139 |
| 4,088,733 | 5/1978 | De Schepper et al. | .............. 423/139 |

*Primary Examiner*—G. Ozaki
*Attorney, Agent, or Firm*—Lewis Messulam; Ewan C. MacQueen

[57] ABSTRACT

A process for separating nickel and cobalt present in a sulfate solution includes using a cationic extractant to extract both metals, treating the loaded cationic extractant with an aqueous chloride or thiocyanate solution to back-extract the cobalt and thereafter recovering the cobalt from the back-extraction aqueous solution by solvent extraction or ion exchange with an anionic extractant.

12 Claims, No Drawings

STRIPPING OF COBALT FROM NICKEL-COBALT LOADED ORGANIC

The present invention relates to a process involving the use of solvent extraction techniques to treat aqueous sulfate solutions which contain nickel and cobalt and recover these metals separately therefrom.

In the hydrometallurgy of nickel, the separation of that metal from cobalt in sulfate solutions which are commonly produced in practice, poses a problem for which no satisfactory solution has been found. However, where these metals are present together in a chloride medium, their separation from one another can be accomplished readily by the use of various liquid or solid extractants. In particular, use can be made of the fact that in concentrated chloride solutions cobalt forms anionic chloro-complexes whereas nickel does not do so. Because of this, anionic extractants such as amines can readily separate the complexed cobalt from the uncomplexed nickel.

On the other hand, in sulfate solutions no extractable anionic complexes are generally present, and cationic or chelating extractants have to be resorted to. The close similarity in behavior between nickel and cobalt is such that known extractants have a relatively poor selectivity of nickel over cobalt. For example, one group of cationic extractants which are useful for nickel and cobalt extraction are carboxylic acids. Despite the fact that they extract nickel better than they do cobalt, the selectivity is such that a very large number of stages would be needed to achieve the desired purity of the nickel and cobalt products. Thus one prior art investigation into the use of a carboxylic acid extractant reported that even after 24 countercurrent stages of extraction, a nickel product was obtained wherein the Ni/Co ratio was less than 100.

To improve the selectivity of the extraction it has been proposed, in U.S. Pat. No. 3,718,458, to introduce a controlled amount of ammonium ions into the solution to be treated, while U.S. Pat. No. 3,932,581 advocates the introduction of magnesium ions into the solution. Alternatively, it has been suggested to perform a non-selective extraction and thereafter recover the loaded metals from the organic phase separately. To achieve this, U.S. Pat. No. 3,055,754 teaches the contacting of the loaded organic successively with aqueous solutions of different acidity, while U.S. Pat. No. 3,701,650 describes the use of hydrogen reduction for selectively and sequentially reducing the loaded metals to their metallic states. None of the above approaches, however, offers an entirely satisfactory solution to the problem of providing a relatively simple yet effective way of obtaining nickel and cobalt products of high purity from mixed sulfate solutions.

Yet another alternative scheme is described in U.S. Pat. No. 3,128,156. In this case advantage is taken of the fact that separation of cobalt from nickel is much easier in chloride media than in sulfate media. The approach described and claimed in this patent entails subjecting the sulfate solution to a non-preferential solvent extraction so that both nickel and cobalt are obtained in an organic solution. The latter is then contacted with an aqueous solution containing hydrochloric acid and/or sodium chloride to strip both nickel and cobalt and provide an aqueous solution which is then treated using an amine extractant to effect the desired separation of the metals from one another. Despite the fact that the separation is now accomplished in a chloride medium, this approach suffers from the disadvantage that an elaborate extraction procedure is needed if nickel and cobalt of high purity are desired. This is because the extraction would have to be performed in such a way as to remove cobalt preferentially from the aqueous phase, and to remove all traces of the cobalt before the nickel recovery can be performed. An extraction characterized by both selectivity and completeness cannot be carried out in a relatively simple manner. Moreover in such a process the nickel recovery, if it is to be carried out electrowinning will entail chloride electrowinning whereas it is often preferred, as is well known, to electrowin nickel from sulfate electrolytes.

It is an object of the present invention to provide a method of separating nickel from cobalt in sulfate solutions efficiently without the need for a very large number of extraction stages.

Accordingly, the present invention provides a process for treating an aqueous sulfate solution containing nickel and cobalt to separate said metals from one another comprising:

I. contacting the sulfate solution with an organic solution containing a non-chelating cationic extractant selected from acids which are organic-soluble in both their free acid and metal salt forms and are effective to extract nickel and cobalt from the sulfate solution;

II. contacting the nickel- and cobalt-loaded organic solution obtained in Step I with an aqueous back-extraction solution wherein the anionic species comprise chloride, thiocyanate or a mixture thereof and the cationic species comprise at least one of nickel, alkali metals and alkaline earth metals, providing the total concentration of anions is at least 3 Molar (M), i.e. 3 gram-ions per liter, and the concentration of nickel cations is at least 0.8M, whereby substantially all of the cobalt is extracted from the organic solution into the back-extraction aqueous solution;

III. stripping nickel from the cobalt free organic solution obtained in Step (II), thereby regenerating the organic solution for recycling to perform Step (I);

IV. subjecting the nickel- and cobalt-containing back-extraction aqueous solution obtained from Step (II) to a solvent extraction or ion exchange treatment with an anionic extractant to extract cobalt preferentially therefrom; and V. stripping cobalt from the anionic extractant used in Step (IV) to obtain an aqueous phase containing said cobalt and regenerated extractant for recycling to perform Step (IV). The first step of the process involves the extraction of nickel and cobalt from the aqueous feed solution. Any of the various organic solutions containing cationic extractants known to be effective for nickel extraction may be used for this purpose. While most of these extractants will exhibit some difference between their affinity for nickel and cobalt, the selection of reagents and conditions can be made with a view to optimizing the extraction, rather than achieving any particular degree of selectivity. In fact it is possible, though by no means essential, to carry out this first step with no selectivity whatsoever, by ensuring essentially complete extraction of all of the nickel and cobalt from the feed. Where this is done the treated aqueous phase becomes a discardable spent solution. It is of course also possible to carry out the first step extraction in such a way that only part of the nickel and/or the cobalt present in the feed is extracted, in which event the treated aqueous phase would need to be recycled as appropriate.

The extractant used in this first step must be selected from those which have sufficient acidity to load nickel at a pH lower than the precipitation pH for Ni(OH)$_2$. Moreover it is important that the selected extractant be one which does not exhibit too strong a preference for cobalt over nickel. The preference of any extractant can be expressed in terms of a selectivity factor, $S_{Ni/Co}$ which is defined by reference to the composition of the aqueous and organic phases in equilibrium with one another as follows:

$S_{Ni/Co}$ = Ni/Co ratio in the aqueous phase/Ni/Co ratio in the organic phase.

The extractant used should be one for which this selectivity factor does not exceed about 5, and preferably $S_{Ni/Co}$ should be no greater than 1. Thus we have found that the extractant di-2-ethylhexyl phosphoric acid, which exhibits a separation factor $S_{Ni/Co}$ of more than 10 is unsuitable for use in this process. On the other hand carboxylic acids constitute a useful class of cationic extractants, and in particular we have used successfully a tertiary mono-carboxylic acid available from the Shell Chemical Company under the trade name: VERSATIC 10. This extractant extracts nickel preferentially, the selectivity factor $S_{Ni/Co}$ being about 0.4. We have also used successfully the extractant dinonylnaphthalene sulfonic acid which is non-selective between nickel and cobalt, i.e. it exhibits a separation factor of about 1. Such extractants can be used in the form of a solution in any of several diluents of the kerosene type.

An essential and novel feature of the process of the invention is the back-extraction of cobalt from the loaded organic phase by contacting it with an aqueous back-extraction solution. This aqueous solution must be a solution of chloride and/or thiocyanate salt or salts, in such amounts as to ensure that the anionic concentration is at least 3 M, and preferably at least 6 M. It must contain nickel in an amount of at least 0.8 M, and may contain in addition to the nickel one or more of the alkali or alkaline earth metals. Where the solution contains only nickel salt, the nickel concentration will of course be much higher than the specified minimum to ensure the necessary anionic concentration. Thus where the solution contains only nickel chloride, at least about 200 grams per liter (g/l) of the latter will be needed. Higher concentrations of the nickel salt, up to the point of saturation, can be used, but it should be stressed that saturation is by no means required. In fact when using a nickel chloride solution for back-extraction we prefer a solution containing about 400 g/l of nickel chloride (i.e. about 3 M concentration of Ni$^{++}$ and 6 M concentration of Cl$^-$).

Where the back-extraction solution also contains alkali or alkaline earth metal salts, e.g. where it contains the chlorides of nickel and magnesium or the thiocyanates of nickel and potassium, the nickel salt need not be present in as high a concentration as would be needed in the absence of the other salts. This might be preferred from an economic consideration of the relative costs of the reagents. In all cases it is essential to ensure that the empirically determined criteria of a minimum anionic concentration and a minimum nickel concentration are satisfied.

While the precise mechanism by which the back-extraction proceeds is by no means certain, we believe that it involves an exchange reaction between nickel in the aqueous phase and cobalt in the organic phase. This exchange can be explained on the basis of the ability of cobalt to form chloro- and thiocyanate complexes. Unlike various prior art stripping practices which involve a controlled lowering of the pH to effect a release of cobalt, the present metal-exchange method of back-extraction gives excellent selectivity. Thus despite the use of an aqueous phase which is not saturated with nickel chloride, cobalt can be removed from the organic while the nickel content of the organic is increased rather than decreased. Ideally the organic phase after the back-extraction will contain an amount of nickel which is equivalent in moles to the total amount of nickel and cobalt present in the organic phase before performing this back-extraction step. If the nickel chloride solution used for this second step of the process contains any free hydrochloric acid, then the latter will tend to bring about some amount of stripping not only of cobalt but also of nickel from the organic phase. The overall result of this combination of metal exchange and pH effect will be to minimize the nickel enrichment of the organic phase.

While the back-extraction step is performed in order to effect a nickel- cobalt separation, we have found that the procedure can also provide effective nickel-zinc or nickel-copper separation. Of course the latter type of separation is not inherently as difficult at the nickel-cobalt separation and a scheme in accordance with the present invention would not be resorted to unless cobalt is present in the nickeliferous sulfate feed solution. If however zinc and copper are also present in the initial sulfate feed, and are extracted in the first step of the process, we have found that an aqueous solution containing nickel chloride and potassium thiocyanate will adequately extract all three of the metals: cobalt, zinc and copper, to leave an organic phase containing essentially only nickel.

The recovery of the nickel from the organic solution which has been subjected to the cobalt back-extraction can be accomplished by means of a stripping operation with the aid of an aqueous acidic solution and subsequent treatment of the pregnant aqueous solution; for example by electrowinning. It is an advantage of the process of the invention that the electrowinning operation may if desired be carried out in a chloride-free medium. Thus a sulfate electrolyte may be used, with spent electrolyte from the operation being recycled to perform the stripping of nickel from the purified organic stream. Of course if chloride electrowinning is preferred this can be effected in a corresponding manner with the spent electrolyte being recycled, after addition of any hydrochloric acid necessary to adjust the pH thereof, to perform the nickel stripping. As an alternative to this aqueous stripping followed by electrowinning, it is possible to recover the nickel from the cobalt-free organic phase by treating the latter with hydrogen so as to reduce the nickel to its elemental form, and separating the nickel from the organic.

The recovery of a pure cobalt product now requires the separation of that metal from the nickel present therewith in the aqueous chloride or thiocyanate stream obtained from the back-extraction step. This task can be accomplished readily with the aid of a tertiary amine such as tri(iso-octyl)amine. The task is simplified by the fact that it is unnecessary to remove all traces of cobalt from the chloride aqueous phase since the latter is merely recycled to perform further back-extraction. As an alternative to liquid-liquid extraction, the cobalt may be extracted from the back-extraction aqueous phase with the aid of an ion exchange resin, e.g. a commercially available anion-exchange resin of the quaternary ammonium type. Where the aqueous phase contains some impurities other than cobalt, e.g., zinc or copper, it will be necessary to remove these in order to obtain a cobalt product of high purity; the purification procedures needed are however well known in the art and are therefore not described herein.

As previously stated, the nickel-containing chloride or thiocyanate solution from which cobalt has been extracted is not treated to extract nickel but is recirculated to perform the cobalt back-extraction of Step II. In general it will be necessary to add the appropriate nickel salt to the solution to compensate for the nickel which was previously exchanged for cobalt. The composition is therefore adjusted prior to recycling the solution to ensure that the nickel ion concentration exceeds the minimum 0.8 M needed for success of the cobalt back-extraction operation.

Some examples will now be described. Unless otherwise specified any percentages quoted are percentages by weight.

EXAMPLE 1

A sulfate process solution, containing mainly nickel with lesser amounts of cobalt, magnesium, zinc and copper, was used as a feed solution. It was contacted with a 1.7 molar solution of the carboxylic acid extractant: VERSATIC 10 in a kerosene diluent. A simple one-step extraction was used, with base being added to ensure a pH of about 6 and the temperature was 50°–60° C. As a result, after separation from the aqueous phase, a loaded organic phase was obtained which analyzed 19.2 g/l of Ni, 0.65 g/l of Co, 0.42 g/l of Mg, 0.33 g/l of zinc and 0.14 g/l of Cu.

An aqueous solution containing 400 g/l of nickel chloride was used to perform a series of five cobalt back-extraction tests. Each of the tests consisted of a single-stage contact at 50°–60° C. between the chloride solution and the loaded organic. The tests differed from one another only in respect of the phase ratios used, which ranged from a 0.15 (volume ratio of organic to aqueous) to 10. After separation of the equilibrated phases, analyses obtained were as shown in Table 1.

It will be seen from those results that cobalt was extracted in all cases, while the nickel content of the organic remained constant or increased. At the same time all of the other impurities were extracted by the aqueous nickel chloride, leaving an organic phase which, in all cases except where high ratios of organic to aqueous were used, can be stripped to provide a solution from which high purity nickel can be electrowon. Thus the test with equal volumes of organic and aqueous phases yielded an equilibrated organic solution in which the Ni/Co ratio exceeded 1000.

TABLE : 1

| Phase Ratio O/A | Analyses (g/l) of Equilibrated Phases | | | | | | | | |
|---|---|---|---|---|---|---|---|---|---|
| | Organic | | | | | Aqueous | | | |
| | Ni | Co | Mg | Zn | Cu | Co | Mg | Zn | Cu |
| 0.15 | 21.2 | 0.004 | <0.0001 | 0.0006 | 0.014 | 0.17 | 0.089 | 0.14 | 0.033 |
| 1.0 | 19.2 | 0.019 | <0.0001 | 0.001 | 0.073 | 0.64 | 0.43 | 0.85 | 0.098 |
| 2.0 | 19.2 | 0.038 | <0.0001 | 0.001 | 0.10 | 1.28 | 0.86 | 1.12 | 0.12 |
| 5.0 | 19.2 | 0.087 | 0.002 | 0.002 | 0.11 | 3.10 | 2.20 | 1.80 | 0.16 |
| 10.0 | 19.6 | 0.150 | 0.002 | 0.002 | 0.11 | 6.30 | 5.20 | 4.25 | 0.33 |

EXAMPLE 2

Another sulfate aqueous feed was contacted with an organic solution containing 100 g/l of a carboxylic acid extractant available from Matheson, Coleman and Bell Inc. under the trade name: NAPHTHENIC acid. After a simple one-stage loading procedure, the organic solution contained: 8.48 g/l of Ni, 0.32 g/l of Co, 0.43 g/l of Mg, 0.15 g/l of Zn and 0.69 g/l of Cu.

As in the previous example a series of back-extraction tests were carried out on this loaded organic solution; in this case the aqueous solution used for the test contained about 400 g/l of nickel chloride. The analyses of the equilibrated phases are given in Table 2. While these results are less dramatic than those obtained in the previous example, they are nevertheless satisfactory and show that with a multistage countercurrent operation an organic phase containing almost exclusively nickel could be obtained. It will be noted that in this case the nickel content of the organic was slightly lowered during the back-extraction indicating that a certain amount of stripping due to pH variation was taking place at the same time as the cobalt back-extraction was proceeding.

TABLE : 2

| Phase Ratio O/A | Analyses (g/l) of Equilibrated Phases | | | | | | | |
|---|---|---|---|---|---|---|---|---|
| | Organic | | | | | Aqueous | | |
| | Ni | Co | Mg | Zn | Cu | Co | Mg | Zn | Cu |
| 1.0 | 7.49 | 0.0093 | 0.001 | 0.003 | 0.29 | 0.32 | 0.46 | 0.14 | 0.40 |
| 2.0 | 7.49 | 0.10 | 0.024 | 0.013 | 0.40 | 0.44 | 0.79 | 0.26 | 0.45 |
| 5.0 | 7.31 | 0.12 | 0.027 | 0.009 | 0.24 | 0.94 | 1.80 | 0.73 | 1.78 |
| 10.0 | 7.96 | 0.23 | 0.20 | 0.076 | 0.50 | 0.75 | 2.14 | 0.79 | 1.90 |

EXAMPLE 3

A similar set of back-extractions to those described above were carried out on an organic phase which contained 88 g/l of a alpha-bromolauric acid in a hydrocarbon diluent. The loaded organic in this case contained: 8.2 g/l of Ni, 0.31 g/l of Co and 0.15 g/l of Zn. It was contacted, in a single stage, with a 400 g/l nickel chloride aqueous solution and the results are shown in Table 3.

TABLE : 3

| Phase Ratio O/A | Analyses (g/l) of Equilibrated Phases | | | | |
|---|---|---|---|---|---|
| | Organic | | | Aqueous | |
| | Ni | Co | Zn | Co | Zn |
| 1.0 | 8.03 | 0.013 | 0.003 | 0.31 | 0.15 |
| 2.0 | 8.17 | 0.019 | 0.004 | 0.61 | 0.29 |
| 5.0 | 8.34 | 0.040 | 0.005 | 1.42 | 0.79 |

TABLE : 3-continued

| Phase Ratio | Analyses (g/l) of Equilibrated Phases | | | | |
|---|---|---|---|---|---|
| | Organic | | | Aqueous | |
| O/A | Ni | Co | Zn | Co | Zn |
| 10.0 | 8.57 | 0.066 | 0.014 | 2.32 | 1.34 |

In the case of the test wherein equal volumes of aqueous and organic phases were equilibrated, it will be seen that a small amount of nickel stripping accompanied the cobalt back-extraction. On the other hand, when a high organic to aqueous phase volume ratio was used, the nickel content of the organic phase increased during the back-extraction tests.

EXAMPLE 4

For this test an organo-substituted sulphonic acid was subjected to back-extraction with an aqueous nickel chloride solution. The organic feed was made up of 3 parts by volume of commercial kerosene-type diluent, with 1 part by volume of a commercial extractant which consists of a 40% solution of dinonylnaphthalene sulfonic acid in heptane. This organic feed was loaded with 11.0 g/l of nickel and 1.0 g/l of cobalt. It was treated with an aqueous solution containing 450 g/l of nickel chloride. Equal volumes of aqueous and organic phases were used which resulted in the mixture being aqueous-continuous. After a 30 minute contact at 60° C., the phases were separated. The nickel contact of the organic phase was found to be virtually unchanged, while its cobalt content had been lowered to 0.1 g/l.

EXAMPLE 5

To illustrate the use of aqueous back-extraction solutions which contain cations other than nickel, a series of tests were carried out with solutions containing various amounts of nickel and/or magnesium chlorides. In all cases the amounts were chosen so that the total chloride content of the solution was 6.8 M, i.e. the total cationic concentration was 3.4 M. All of the tests were carried out under the following conditions:

Contact time: 30 minutes
Continuous phase: aqueous
Phase ratio: 1:1 by volume
Temperature: 60° C.
Organic feed: 4 parts by volume of carboxylic acid VERSATIC 10 in 6 parts by volume of kerosene diluent, and assaying in g/l: 19.8 Ni, 0.61 Co, 0.51 Zn, 0.14 Cu and 2.80 Mg.

The pH was not adjusted from its ambient value which ranged between 3.6 and 4.5 in the tests. Four of the five tests performed were in accordance with the invention inasmuch as the minimum amount of nickel needed in solution was present. In the fifth test the back extraction was carried out with a solution containing only magnesium chloride. The results obtained are shown in Table 4 below, from which it can be seen that satisfactory back-extraction of the cobalt as well as of the zinc, copper and magnesium was obtained in all of the tests except the one wherein the aqueous feed contained only magnesium chloride. The absence of the minimum (0.8 M) amount of nickel from the aqueous feed resulted in inadequate extractions of cobalt and copper, undesirable extraction of some of the nickel and almost no extraction of the magnesium from the organic phase.

TABLE 4

| Molar Composi- Aqueous Feed | | | Metal Content (g/l) of Final Phases | | | | | | | | | |
|---|---|---|---|---|---|---|---|---|---|---|---|---|
| | | | Aqueous | | | | | Organic | | | | |
| Ni | Mg | pH | Ni | Co | Zn | Cu | Mg | Ni | Co | Zn | Cu | Mg |
| 3.40 | 0 | 3.8 | ~200 | 0.68 | 0.55 | 0.090 | 2.8 | 21.4 | 0.019 | 0.001 | 0.077 | 0.001 |
| 2.55 | 0.85 | 3.6 | ~150 | 0.66 | 0.55 | 0.13 | 27.0 | 22.4 | 0.017 | <0.0001 | 0.036 | 0.011 |
| 1.70 | 1.70 | 3.8 | ~100 | 0.66 | 0.55 | 0.11 | 55.0 | 22.4 | 0.030 | <0.0001 | 0.051 | 0.029 |
| 0.85 | 2.55 | 4.1 | ~50 | 0.63 | 0.54 | 0.028 | 81.0 | 22.4 | 0.045 | <0.0001 | 0.069 | 0.092 |
| 0 | 3.40 | 4.5 | 3.00 | 0.27 | 0.51 | 0.02 | 101.0 | 16.8 | 0.34 | 0.006 | 0.12 | 2.62 |

~ = approximately

EXAMPLE 6

A back-extraction test was carried out with an aqueous phase which contained nickel chloride and potassium thiocyanate in amounts corresponding to molarities of 1.7 for nickel and 3.4 for potassium. The total anionic concentration was thus 6.8 M as in the tests of Example 5, except that in this example equal amounts of chloride and thiocyanate ions were present. The aqueous phase had a pH of 5.1 and was contacted with an organic having the same composition as that used in the tests of Example 5 under the same conditions as used for those tests. Table 5 below shows the assays of the final phases which indicate adequate back-extractions in the case of cobalt, zinc and magnesium, while the copper extraction was far superior to that obtained with the all-chloride aqueous feeds.

TABLE 5

| | Final Aqueous Composition (g/l) | Final Organic Composition (g/l) |
|---|---|---|
| Nickel | ~100 | 23.0 |
| Cobalt | 0.64 | 0.058 |
| Zinc | 0.55 | 0.006 |
| Copper | 0.19 | 0.003 |
| Magnesium | 5.25 | 0.025 |

~ = approximately

EXAMPLE 7

The previously described examples all involved a single-stage back-extraction procedure. The following results illustrate the effectiveness of a back-extraction carried out counter-currently with two theoretical stages. The aqueous feed used was 3.4 M nickel chloride solution, and the organic feed comprised a carboxylic acid solution similar to that used in Examples 5 and 6, except that the metal contents (in g/l) were as follows: 19.7 Ni, 0.60 Co, 1.38 Cu, 0.45 Zn, 0.40 Mg and 0.26 Fe.

The temperature, phase ratio and contact time in each stage were the same as in Examples 5 and 6, although it should be pointed out that in practising the process commercially such long contact times would not be necessary and retentions of the order of a few minutes per stage would be restored to. In Table 6 below the assays are given for the aqueous and organic phases in a countercurrent scheme wherein the stages are designated 1 and 2 with the organic phase being introduced into Stage 1 and withdrawn from Stage 2.

TABLE 6

| | Metal Content (g/l) of Organic Phase | | | Metal Content (g/l) Aqueous Phase | | |
|---|---|---|---|---|---|---|
| | Input to Stage 1 (Feed Organic) | Output From Stage 1 (Input to Stage 2) | Output From Stage 2 (Final Organic) | Input to Stage 2 (Feed Aqueous) | Output From Stage 2 (Input to Stage 1) | Output From Stage 1 (Final Aqueous) |
| Ni | 19.7 | 23.2 | 23.6 | ~200 | ~200 | ~200 |
| Co | 0.60 | 0.015 | 0.001 | 0 | 0.028 | 0.65 |
| Cu | 1.38 | 1.29 | 1.08 | 0 | 0.20 | 0.26 |
| Zn | 0.45 | 0.002 | 0.001 | 0 | 0.006 | 0.45 |
| Mg | 0.40 | 0.002 | 0.001 | 0 | 0.007 | 0.42 |
| Fe | 0.26 | 0.26 | 0.26 | 0 | 0.003 | 0.003 |

~ = approximately

It will be appreciated that various aspects of the recovery of pure nickel and cobalt from mixed sulfate solutions have not been described in great detail inasmuch as they are well known to those skilled in the art. Such details include the stripping of nickel from the equilibrated organic solutions which can be accomplished with a dilute sulfuric acid solution, and the recovery of cobalt from the chloride aqueous phase by means of an anionic extractant such as a tertiary amine. Such details are not critical features of the present invention. Moreover modifications may be made to the details of the specific embodiments described without departing from the scope of the invention, which is defined by the appended claims.

We claim:

1. A process for treating an aqueous sulfate solution containing nickel and cobalt to separate said metals from one another comprising:
   I. contacting the sulfate solution with an organic solution containing a non-chelating cationic extractant selected from acids which are organic-soluble in both their free acid and metal salt forms and are effective to extract nickel and cobalt from the sulfate solution;
   II. contacting the nickel- and cobalt-loaded organic solution obtained in Step (I) with an aqueous back-extraction solution wherein the anionic species comprise chloride, thiocyanate or a mixture thereof and the cationic species comprise at least one of nickel, alkali metals and alkaline earth metals, providing the total concentration of anions is at least 3 M and the concentration of nickel cations is at least 0.8 M, whereby substantially all of the cobalt is back-extracted from the organic solution into the aqueous solution;
   III. stripping of nickel from the cobalt-free organic solution obtained in Step (II), thereby regenerating the organic solution for recycling to perform Step (I);
   IV. subjecting the nickel- and cobalt-containing back-extraction aqueous solution obtained from Step (II) to a solvent extraction or ion exchange treatment with an anionic extractant to extract cobalt preferentially therefrom; and
   V. stripping cobalt from the anionic extractant used in Step (IV) to obtain an aqueous phase containing said cobalt and regenerated extractant for recycling to perform Step (IV).

2. A process as claimed in claim 1 wherein the cationic extractant is one which exhibits a selectivity factor, $S_{Ni/Co}$, defined by reference to the compositions of equilibrated aqueous and organic phases as follows:
$S_{Ni/Co}$ = Ni/Co ratio in the aqueous phase/Ni/Co ratio in the organic phase
which does not exceed 1.

3. A process as claimed in claim 2 wherein the cationic extractant is selected from carboxylic acids and organo-substituted sulfonic acids.

4. A process as claimed in claim 3 wherein the cationic extractant is a tertiary mono-carboxylic acid.

5. A process as claimed in claim 1 wherein the stripping operation of Step (III) comprises contacting said cobalt-free organic solution with hydrogen to reduce the nickel contained therein to elemental form.

6. A process as claimed in claim 1 wherein the stripping operation of Step (III) comprises contacting said cobalt-free organic solution with an acidic aqueous strip-solution.

7. A process as claimed in claim 6 further comprising the step of subjecting the resulting nickel-containing aqueous strip-solution to electrowinning to recover a nickel product of high purity, and recycling spent electrolyte from the electrowinning operation to perform the nickel stripping operation of Step (III) therewith.

8. A process as claimed in claim 7 wherein the spent electrolyte comprises a chloride-free sulfate solution.

9. A process as claimed in claim 1 wherein the aqueous back-extraction solution used for performing Step (II) has an anionic concentration of at least 6 M.

10. A process as claimed in claim 1 wherein the aqueous back-extraction solution used for performing Step (II) contains at least 400 grams per liter of nickel chloride.

11. A process as claimed in claim 1 wherein the aqueous back-extraction solution used for performing Step (II) contains nickel chloride and magnesium chloride.

12. A process as claimed in claim 1 wherein the aqueous back-extraction solution used for performing Step (II) contains nickel chloride and potassium thiocyanate.

* * * * *